United States Patent [19]

Mowill

[11] 4,308,718
[45] Jan. 5, 1982

[54] BLEEDOFF OF GAS FROM DIFFUSERS IN FLUID FLOW MACHINES

[76] Inventor: Jan Mowill, Rugdeveien 7, Oslo 3, Norway

[21] Appl. No.: 973,609

[22] Filed: Dec. 27, 1978

[30] Foreign Application Priority Data

Jan. 2, 1978 [NO] Norway .................................. 780010

[51] Int. Cl.³ .............................................. A02C 7/00
[52] U.S. Cl. .................. 60/39.02; 415/207; 415/DIG. 1
[58] Field of Search .................. 60/39.02, 39.5, 39.07; 415/207, 219 B, DIG. 1; 417/78, 84, 89

[56] References Cited

U.S. PATENT DOCUMENTS 3,761,205 9/1973 Cronstedt .......................... 417/407
3,856,430 12/1974 Langham .......................... 415/207

FOREIGN PATENT DOCUMENTS 1199042 12/1959 France .............................. 60/39.07

OTHER PUBLICATIONS

Chang, Paul K., *Control of Flow Separation*, N.Y., McGraw Hill, 1976, pp. 6, 7, & 159.

Primary Examiner—Louis J. Casaregola
Attorney, Agent, or Firm—Holman & Stern

[57] ABSTRACT

In a fluid flow machine comprising a compressor including a compressor diffuser and a turbine including an exhaust gas diffuser compressed air from boundary layers or vortex flows in the compressor diffuser is bled off and used as a driving medium for removing exhaust gas from boundary layers or vortex flows in the exhaust gas diffuser. Since the pressure of the exhaust gas to be removed from the exhaust gas diffuser is below the ambient pressure a suction has to be established to remove the desired gas from the boundary layers or vortex flows. This suction is established by an ejector or a pump which is driven by the energy of the compressed air bled from the compressor diffuser.

1 Claim, 2 Drawing Figures

BLEEDOFF OF GAS FROM DIFFUSERS IN FLUID FLOW MACHINES

BRIEF SUMMARY OF THE INVENTION

The present invention relates to a method of stabilizing the flow of working medium in fluid flow machines such as turbochargers and gas turbine engines by bleeding off a part of the working medium from boundary layers or vortex flows in the machine.

It is known that the flow pressure losses in diffusers may be reduced by selective bleedoff of parts of the working medium. When working medium such as air with low kinetic energy is bled from a vortex flow in a diffuser, the vortex will be replenished by air of a higher energy level from the mainstream and thus be stabilized. A stepped diffuser (a diffuser in which the flow area abruptly increases to the desired value instead of increasing gradually such as in conical diffusers) with such a stabilized vortex flow may function without detachment of the flow even at very high diffuser area ratios. A bleedoff of working medium may also be used for obtaining a given pressure recovery with a shorter diffuser length, whereby the diffuser will be lighter and probably also cheaper. A bleedoff of boundary layers has a beneficial effect on most types of diffusers, but the effect is especially large in stepped diffusers as indicated above.

However, the utilization of these advantages has been very limited, because bleeding off a part of the working medium constitutes a loss which at least partly offsets the increase of the efficiency due to stabilization of the flow. In addition, pumps or other suction devices must be used when bleeding off working medium from exhaust gas diffusers, since the pressure in such diffusers is lower than the ambient pressure, requiring bleedoff of the working medium by suction, whereas working medium may be removed from the high pressure region, e.g. from a compressor diffuser, simply by tapping.

The object of the present invention is to provide a simple method of effecting the bleedoff of working medium from diffusers in turbo-machinery in such a manner that the total efficiency can be improved to such an extent that a bleedoff of working medium constitutes a more attractive and interesting possibility.

The invention is based upon the recognition that a bleedoff from a high pressure region and a low pressure region may be combined in an advantageous manner to provide a substantially better effect than when the operation of bleeding off working medium from these regions are effected independently of each other. Thus, the bled high pressure air may be used directly to provide a removal of air from the low pressure region. This means that a working medium which it is advantageous to remove from a high pressure region, may be utilized to provide energy for drawing off a working medium which it is advantageous to remove from a low pressure region.

Thus, the method of the invention resides in coupling the operations of bleeding off working medium from two or more regions of the machine, the energy of a working medium bled from a high pressure region being used to remove working medium by suction from a low pressure region, whereby the total efficiency is improved. Typical examples of high pressure regions from which a bleeding of working medium may result in an increased efficiency, are regions of flow detachment or boundary layers in a compressor diffuser. When the fluid flow machine forms a two-stage system being formed by e.g. a turbo-charger or a turboshaft engine, working medium bled from the diffusing portions of a compressor may according to the invention be used to draw off working medium from the diffusing portions of a turbine.

The bled high pressure medium may also be used for other purposes before its energy is utilized to draw off working medium from the exhaust gas diffuser of the turbine. Thus, the medium may be used for cooling of the machinery, whereby heat energy is supplied to the medium, which energy may be utilized in a subsequent expansion process.

A turbo-machinery in which the method of the invention may be carried out, preferably comprises a compressor including a compressor diffuser and a turbine including an exhaust gas diffuser. Such a machinery may e.g. be a turbo-charger or a turboshaft engine and is characterized in that it comprises an energy conversion means which is operated by working medium bled from a boundary layer or a vortex flow in the diffusing portions of the compressor and supplies energy for removing working medium by suction from a boundary layer or a vortex flow in the diffusing portions of the turbine.

The amount of working medium bled from the compressor may be varied in any suitable manner so as to be adapted to the operative conditions of the turbine part of the machinery. For controlling the capacity and the response of a turbo-charger the amount of bled working medium (air) may e.g. be varied instead of or in combination with by-passing the exhaust gases, so-called "waste-gating".

As indicated above, a bleedoff is especially effective in stepped diffusers, since the bleeding may be effected from a single area close to the step in the flow path, and the present invention is therefore especially useful in connection with such diffusers. According to available data a stepped diffuser with bleedoff may provide a pressure recovery of about 90% compared with about 60% for an ordinary linear conical diffuser. A pressure recovery or efficiency of above 60% may also be obtained with conical diffusers without a bleedoff if consisting of a series of coaxially placed diffusers. However, this involves a far more expensive and mechanically complicated design which is seldomly used. In order to obtain a pressure recovery of about 90% it may be necessary to bleed off approximately 1-3% of the working medium, but it may also be possible to manage with smaller amounts. However, the energy loss associated with such a bleedoff of working medium can be substantially reduced when a bleedoff from a high pressure region is combined in accordance with the invention with a removal by suction from a low pressure region. The aerodynamic gains may then provide a total improvement of the efficiency in the order of 10%. In the case of a gas tubine this may result in a corresponding reduction of the fuel consumption. The use of stepped diffusers is believed also to provide substantial practical advantages with respect to manufacturing costs. In connection with the high exhaust gas velocities used or planned in modern radial turbines a good exhaust gas diffuser will be of especial significance to the total thermal efficiency. The importance of the invention is believed to be especially great for medium and small turbo-machinery such as turbo-chargers and gas turbines for use in propelling machinery in e.g. automobiles, since the boundary layers in such small machines occupy a comparatively large part of the flow passages, thereby resulting in a rather large reduction of the efficiency. The concurrent bleedoff with internal utilization of the energy in the high pressure medium according to the invention will therefore provide an especially large increase of the efficiency in small machinery, so that the disadvantage of a low efficiency inherent in such small turbo-machinery may be reduced.

The invention will now be further illustrated, reference being had to the drawing.

DETAILED DESCRIPTION

Figure 1:
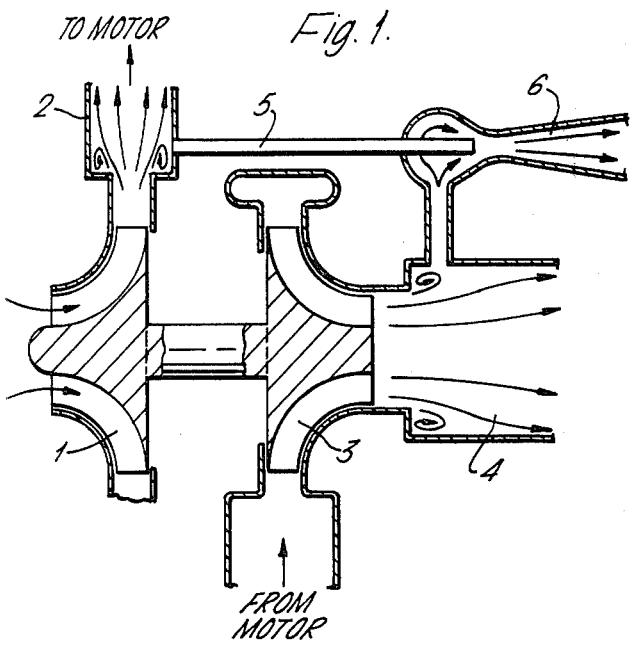
FIG. 1 diagrammatically illustrates a turbo-charger having a stepped diffuser in which a concurrent bleedoff of working medium according to the invention is employed.

In FIG. 1 there is shown a compressor 1 which through a stepped compressor diffuser 2 supplies compressed air to a motor (not illustrated). The exhaust gases from the motor are passed to a turbine 3 having a stepped exhaust gas diffuser 4. The turbine 3 drives the compressor 1. Working medium (air) from the compressor diffuser 2 is bled off through a conduit 5 which leads to an ejector 6 which draws off working medium from the exhaust gas diffuser 4.

Figure 2:
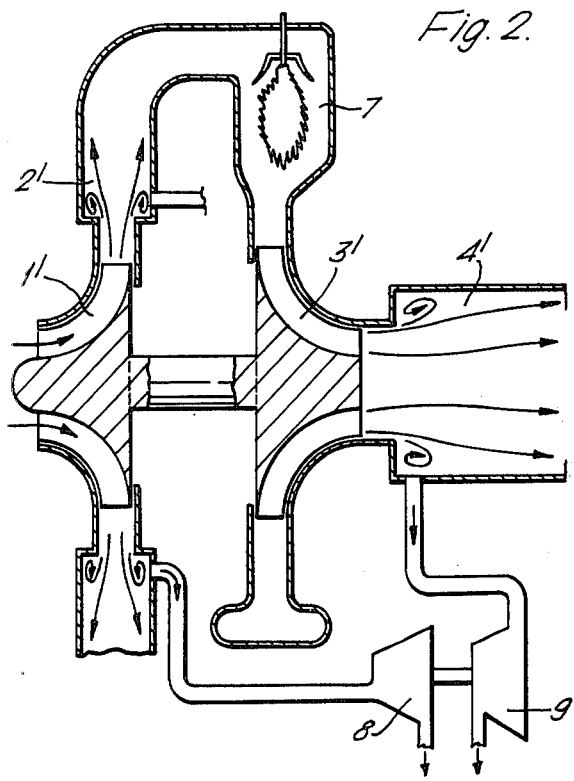
FIG. 2 illustrates a corresponding use of the invention in a gas turbine.

FIG. 2 shows approximately the same in connection with a gas turbine, and corresponding parts in FIG. 2 are therefore designated by the same reference numerals as in FIG. 1 with the addition of a prime. Instead of a motor this embodiment includes a combustion chamber 7. Of course, the turbine 3' generates substantially more energy than the turbine 3 which is only driven by the exhaust gases from the not illustrated motor, and the turbine 3' will therefore in addition to driving the compressor 1' usually also supply energy for operating a further load, e.g. an electric power generator which is not shown. Instead of an ejector 6 the embodiment in FIG. 2 includes an air turbine 8 operating a pump or compressor 9 for removing working medium by suction from the vortex flow in the stepped exhaust diffuser 4'.

The use of an ejector provides the best results when the primary air and the secondary air have approximately the same density. However, by using other solutions than an ejector a better efficiency is usually obtained, but ejectors may still be preferable in connection with small machines, since they have various other advantages such as low costs.

The concurrent bleedoff of working medium according to the invention may also be combined with a cooling of the hot parts of the machinery, the air bled from the high pressure region being used for cooling prior to utilizing the energy in the air in connection with a bleedoff from the exhaust gas diffuser. During cooling heat energy is supplied to the air, a fact which will counteract the flow friction losses which usually are larger when the air is used for cooling purposes.

According to the preceding description the working medium is air and combustion gases respectively, since the invention is illustrated in connection with turbo-chargers and turboshaft engines. However, a corresponding effect may be obtained in connection with other fluids, including liquids. The use of other working mediums, especially vapour and other gases, is therefore within the scope of the invention.

What I claim is:

1. In a method of stabilizing the flow of a working medium in a gas turbine engine, having a compressor with a compressor diffuser and a turbine with an exhaust gas diffuser and wherein the turbine drives the compressor by a common shaft, by bleeding off a part of the working medium from a boundary layer, or vortex flow, in the engine, the improvement whereby the total efficiency of the machine is improved comprising bleeding off a part of the working medium from a first boundary layer, or vortex flow, from said compressor diffuser, bleeding off part of the working medium from a second boundary layer, or vortex flow, from said exhaust gas diffuser at lower pressure than said first boundary layer, coupling said bleedoffs by feeding said working fluid from said compressor diffuser to an air turbine to drive said air turbine thereby, driving an auxiliary pump or compressor by said air turbine, and connecting the suction line of said auxiliary pump or air turbine to said exhaust gas diffuser.

* * * * *